(12) United States Patent
Wang

(10) Patent No.: US 7,887,085 B2
(45) Date of Patent: Feb. 15, 2011

(54) FOLDING AND FIXING STRUCTURE OF A PEOPLE-CARRYING VEHICLE

(76) Inventor: Arthur Wang, No. 181, Dade 1st Rd., Gangshan Township, Kaohsiung County (TW)

( * ) Notice: Subject to any disclaimer, the term of this patent is extended or adjusted under 35 U.S.C. 154(b) by 347 days.

(21) Appl. No.: 12/153,027

(22) Filed: May 13, 2008

(65) Prior Publication Data

US 2009/0284037 A1 Nov. 19, 2009

(51) Int. Cl.
B62B 3/02 (2006.01)
(52) U.S. Cl. ........................................ 280/650; 280/639
(58) Field of Classification Search ................. 280/650, 280/415.1, 491.1, 638, 639, 657, 87.05, 47.38, 280/47.4, 79.2; 296/63, 65.01, 65.05; 297/331, 297/332
See application file for complete search history.

(56) References Cited

U.S. PATENT DOCUMENTS

| | | | | |
|---|---|---|---|---|
| 1,066,033 A * | 7/1913 | Nauts | .......................... | 296/35.4 |
| 1,231,156 A * | 6/1917 | Heaslet | .......................... | 297/15 |
| 2,927,628 A * | 3/1960 | Gill | .......................... | 248/585 |
| 3,385,628 A * | 5/1968 | Lahaie | .......................... | 296/63 |
| 3,784,252 A * | 1/1974 | Peterson | .......................... | 297/364 |
| 4,019,756 A * | 4/1977 | Ishida | .......................... | 280/649 |
| 4,065,178 A * | 12/1977 | Carella et al. | .......................... | 297/341 |
| 4,606,550 A * | 8/1986 | Cone | .......................... | 280/642 |
| 5,257,799 A * | 11/1993 | Cone et al. | .......................... | 280/642 |
| 5,370,408 A * | 12/1994 | Eagan | .......................... | 280/33.994 |
| 5,393,116 A * | 2/1995 | Bolsworth et al. | ....... | 296/65.03 |
| 5,582,453 A * | 12/1996 | Leuchtmann et al. | .... | 296/65.09 |
| 5,588,707 A * | 12/1996 | Bolsworth et al. | ..... | 297/378.12 |
| 5,622,406 A * | 4/1997 | Meschkat et al. | ........... | 297/318 |
| 5,741,046 A * | 4/1998 | Leuchtmann et al. | .. | 297/378.13 |
| 5,823,615 A * | 10/1998 | Haut | .......................... | 297/151 |
| 5,951,102 A * | 9/1999 | Poulson et al. | .............. | 297/130 |
| 6,039,402 A * | 3/2000 | Nemoto | .................. | 297/411.34 |
| 6,070,934 A * | 6/2000 | Schaefer et al. | ................ | 297/14 |
| 6,082,805 A * | 7/2000 | Gray et al. | ................ | 296/65.09 |
| 6,086,086 A * | 7/2000 | Hanson et al. | .............. | 280/650 |
| 6,106,067 A * | 8/2000 | Zhuang et al. | ........... | 297/361.1 |
| 6,152,465 A * | 11/2000 | Shieh | .......................... | 280/62 |
| 6,231,067 B1 * | 5/2001 | Johnson et al. | ............. | 280/650 |
| 6,270,111 B1 * | 8/2001 | Hanson et al. | .............. | 280/650 |
| 6,345,835 B1 * | 2/2002 | Watkins | ...................... | 280/650 |
| 6,419,312 B1 * | 7/2002 | Flannery et al. | ............. | 297/149 |
| 6,443,479 B2 * | 9/2002 | Huang | ........................ | 280/642 |

(Continued)

*Primary Examiner*—J. Allen Shriver, II
*Assistant Examiner*—Brodie Follman
(74) *Attorney, Agent, or Firm*—Rosenberg, Klein & Lee

(57) ABSTRACT

A foldable people-carrying vehicle includes two pivotal members interposed between and pivoted at two ends thereof to a vehicle body and a seat of the vehicle; the vehicle further includes a fixing mechanism to fix the seat; the pivotal members each have a first fixing hole to cooperate with the fixing mechanism in order to fix the seat in a lowered not-in-use position, and a second fixing hole to cooperate with the fixing mechanism to fix the seat in a raised in-use position; the fixing mechanism includes two spring-biased fixing components, which are normally partly held in the fixing holes to fix the seat; a handle is fitted on the seat, and two pulling strings are connected to the handle, and connected to the fixing components respectively; the fixing components can be moved out of the fixing holes for the seat to become movable when the handle is pulled.

5 Claims, 8 Drawing Sheets

U.S. PATENT DOCUMENTS

| | | | |
|---|---|---|---|
| 6,513,875 B1* | 2/2003 | Gray et al. | 297/378.14 |
| 6,588,846 B2* | 7/2003 | Arrenberg et al. | 297/378.12 |
| 7,040,684 B2* | 5/2006 | Tame et al. | 296/65.09 |
| 7,270,375 B2* | 9/2007 | Lutzka et al. | 297/331 |
| 7,273,243 B2* | 9/2007 | Prugarewicz | 296/65.09 |
| 7,516,977 B2* | 4/2009 | Wu et al. | 280/650 |
| 7,578,556 B2* | 8/2009 | Ohba et al. | 297/366 |
| 7,686,389 B2* | 3/2010 | Yamada | 297/15 |
| 7,699,399 B2* | 4/2010 | Satta et al. | 297/378.12 |
| 7,703,567 B2* | 4/2010 | Wang | 180/208 |
| 7,703,726 B2* | 4/2010 | Harrison et al. | 248/166 |
| 2002/0113475 A1* | 8/2002 | Ehr et al. | 297/300.4 |
| 2004/0227331 A1* | 11/2004 | Chen et al. | 280/650 |
| 2005/0046129 A1* | 3/2005 | Antonishak et al. | 280/47.4 |
| 2006/0138795 A1* | 6/2006 | Weber | 296/65.05 |
| 2006/0138836 A1* | 6/2006 | Yudovich | 297/335 |
| 2006/0152055 A1* | 7/2006 | Yudovich | 297/331 |
| 2006/0214457 A1* | 9/2006 | Fukada et al. | 296/65.01 |
| 2006/0214477 A1* | 9/2006 | Fukada et al. | 297/15 |
| 2007/0089648 A1* | 4/2007 | Harrison et al. | 108/115 |
| 2007/0228697 A1* | 10/2007 | Miller et al. | 280/650 |
| 2007/0278767 A1* | 12/2007 | Aubert | 280/642 |
| 2008/0203772 A1* | 8/2008 | Holdampf | 297/15 |
| 2008/0224520 A1* | 9/2008 | Veluswamy et al. | 297/335 |
| 2008/0252113 A1* | 10/2008 | Alexander et al. | 297/216.12 |
| 2008/0284195 A1* | 11/2008 | Lawall et al. | 296/65.01 |
| 2009/0127828 A1* | 5/2009 | Longenecker et al. | 280/650 |
| 2009/0236826 A1* | 9/2009 | Queen | 280/650 |
| 2009/0243323 A1* | 10/2009 | Mitsuhashi | 296/65.05 |
| 2009/0308676 A1* | 12/2009 | Wang | 180/208 |
| 2010/0084831 A1* | 4/2010 | Wang | 280/39 |
| 2010/0108418 A1* | 5/2010 | Kuramoto | 180/65.51 |
| 2010/0117425 A1* | 5/2010 | Abe et al. | 297/335 |

* cited by examiner

FOLDING AND FIXING STRUCTURE OF A PEOPLE-CARRYING VEHICLE

BACKGROUND OF THE INVENTION

1. Field of the Invention

The present invention relates to a folding and fixing structure of a people-carrying vehicle, more particularly one, which allows the seat of the vehicle to be easily moved between and fixed in a raised in-use position and a lowered not-in-use one; the people-carrying vehicle will have a smaller size, and therefore an be more easily stored and transported after the seat is fixed in the lowered not-in-use position.

2. Brief Description of the Prior Art

A person is prone to suffer from muscular dystrophy of the legs and physiological deterioration, and become unable to stand up or walk by himself/herself after he/she becomes very old, has injured lower limbs as the result of a traffic accident, has been bedridden for a long time or gets serious sickness such as paralysis of the lower half of the body. Consequently, such a person has to use a crutch to help him/her move. However, crutches can only help those people who still can walk by themselves, and the users still can't move rapidly or a long distance if they have the above-mentioned physical problems.

Therefore, the industry developed various people-carrying vehicles such as electric walk-substituting carts and electric wheel chairs for use by the elderly and physically disabled persons.

However, most of currently-existing people-carrying vehicles can't be reduced or folded to occupy less space for easy transportation and storage. Consequently, such people-carrying vehicles aren't convenient to use.

To overcome the above-mentioned problem, the industry developed a dismantleable people-carrying vehicle, which can be easily separated into several parts by the users. However, it still takes a certain amount of time and labor to separate the vehicle. Therefore, such a people-carrying vehicle isn't convenient to use, either.

SUMMARY OF THE INVENTION

It is a main object of the present invention to provide a folding and fixing structure of a people-carrying vehicle, which allows the seat of the vehicle to be easily moved between and fixed in a raised in-use position and a lowered not-in-use one, to overcome the above problems.

A people-carrying vehicle in accordance with an embodiment of the present invention includes two pivotal members, which are interposed between and pivoted at two ends thereof to a main body and a seat of the vehicle. The vehicle further includes a fixing mechanism to fix the seat in position. Each of the pivotal members has a first fixing hole to cooperate with the fixing mechanism so as to fix the seat in a lowered not-in-use position, and includes a second fixing hole to cooperate with the fixing mechanism so as to fix the seat in a raised in-use position. Two holding sleeves are firmly joined on the main body to face the curved slots respectively. The fixing mechanism includes two spring-biased fixing components, which are normally partly held in the holding sleeves and partly held in the fixing holes to fix the seat. Moreover, a handle is fitted on the seat, and two pulling strings are connected to the handle, and connected to the fixing components respectively; therefore, the fixing components can be moved out of the fixing holes for the seat to become movable when the handle is pulled.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
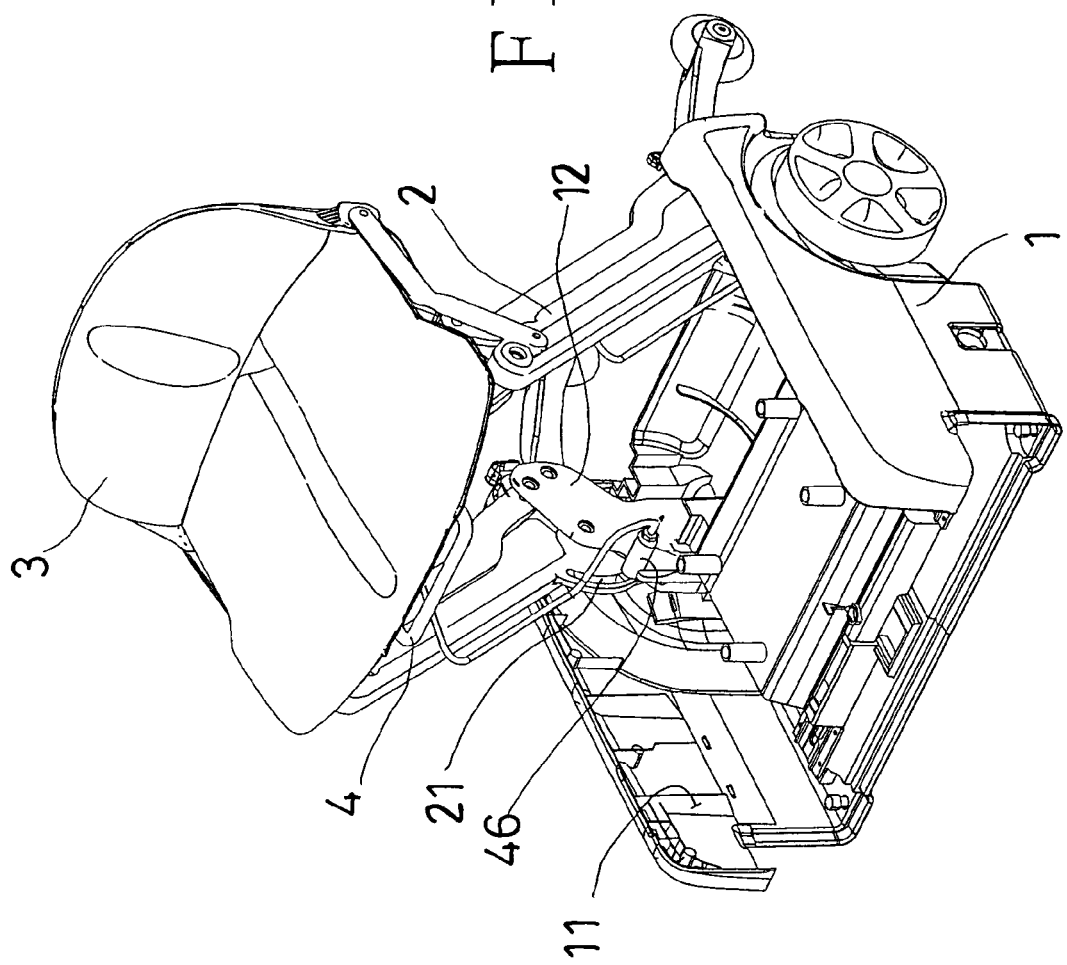
FIG. 1 is a perspective view of the present invention.
Figure 2:
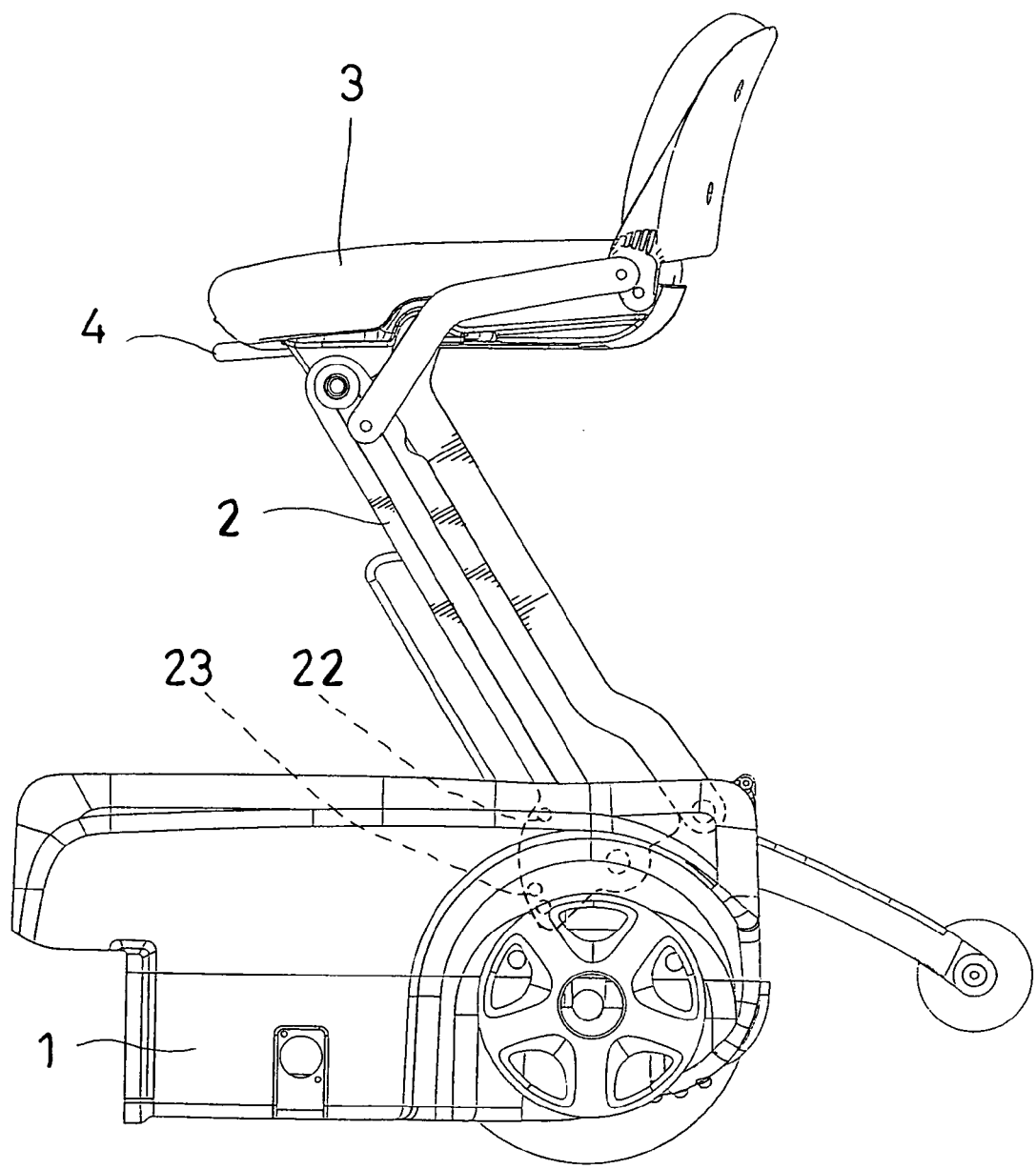
FIG. 2 is a side view of the present invention.

Referring to FIGS. 1 and 2, a preferred embodiment of a foldable people-carrying vehicle of the present invention includes a vehicle body 1, two pivotal members 2 pivoted on the vehicle body 1, a seat 3 pivoted to the pivotal members 2, and a fixing mechanism 4.

The vehicle body 1 has a hollow holding portion 11 on an upper side thereof, which will receive the seat 3 when the seat 3 is lowered to a not-in-use position. The vehicle body 1 further has a supporting member 12 on each of two sides thereof.

Figure 3:
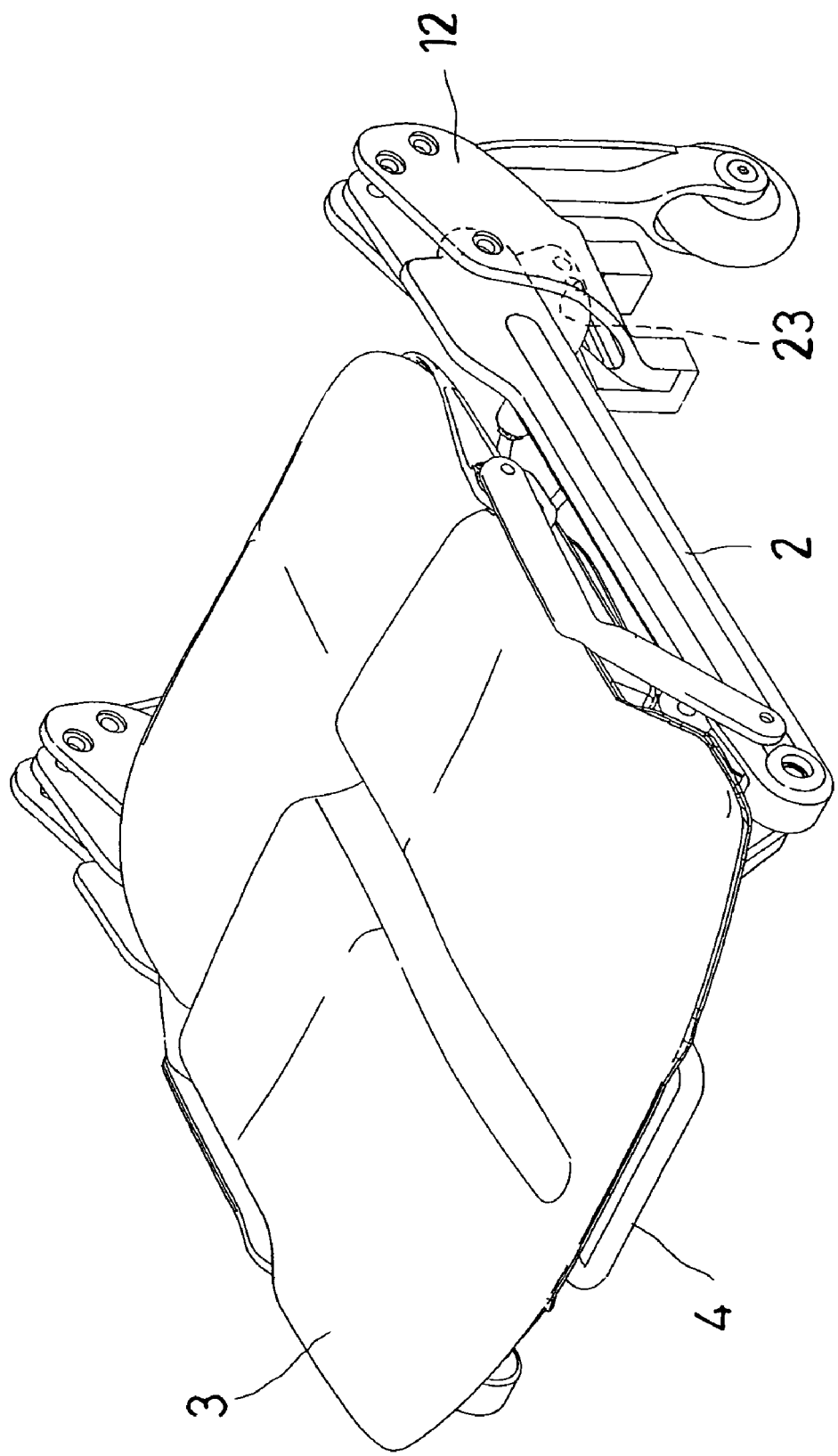
FIG. 3 is a perspective view of the fixing mechanism of the present invention.
Figure 4:
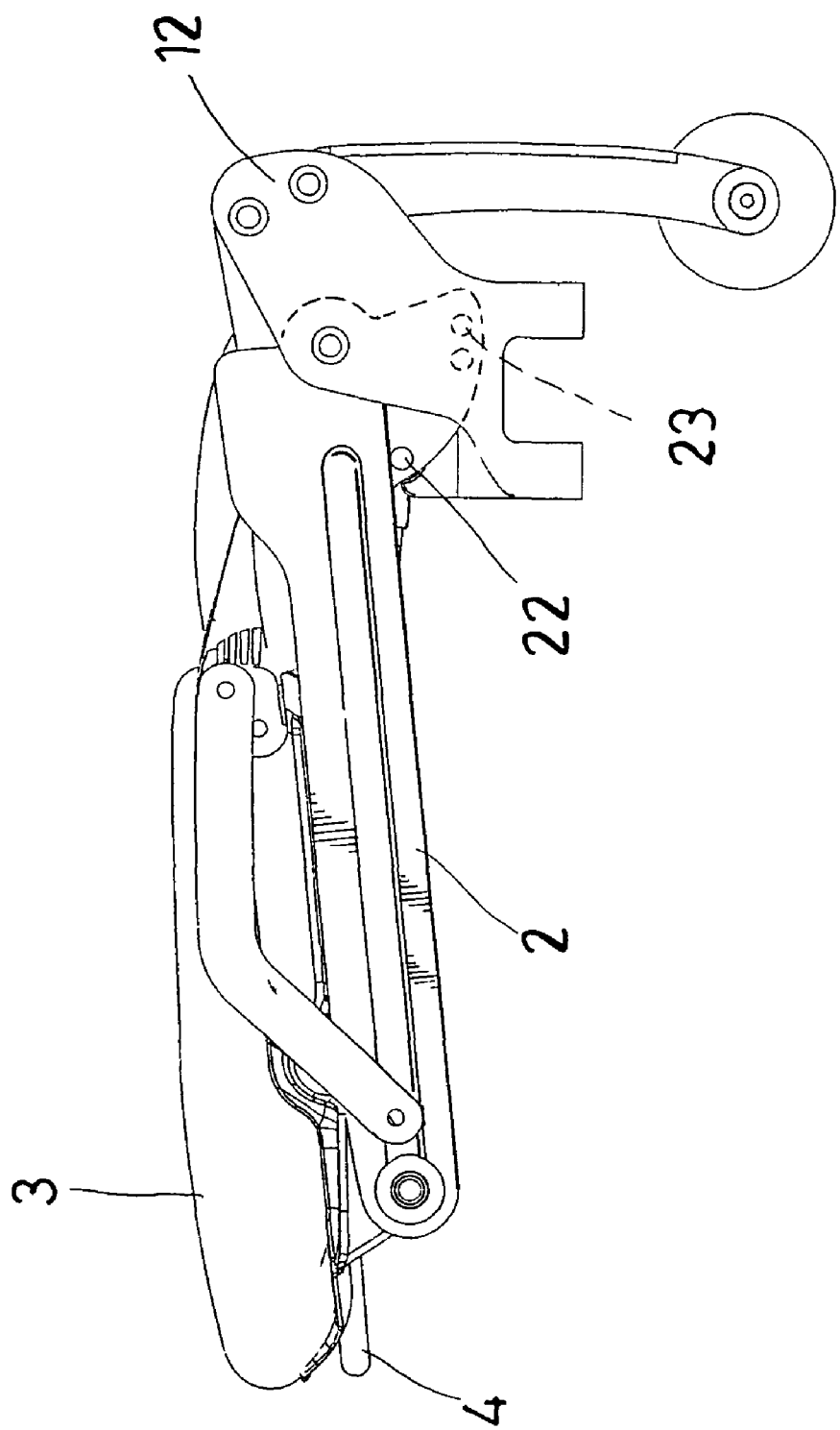
FIG. 4 is a front view of the fixing mechanism.

Referring to FIGS. 3 and 4 as well, the pivotal members 2 are each pivoted to a respective said supporting member 12 of the vehicle body 1 at a lower end thereof. And, the seat 3 is pivoted to upper ends of the pivotal members 2.

The pivotal members 2 each have a curved slot 21 (FIG. 1) near a lower edge thereof, and first fixing hole 22 adjoining a lower end of the curved slot 21, which is used together with the fixing mechanism 4 to fix the seat 3 in the lowered not-in-use position. Each of the pivotal members 2 further has at least two second fixing holes 23 adjoining an upper end of its curved slot 21, which each can be used together with the fixing mechanism 4 to fix the seat 3 in a raised in-use position. Therefore, the seat 3 can be fixed in any of several different raised in-use positions.

Figure 5:
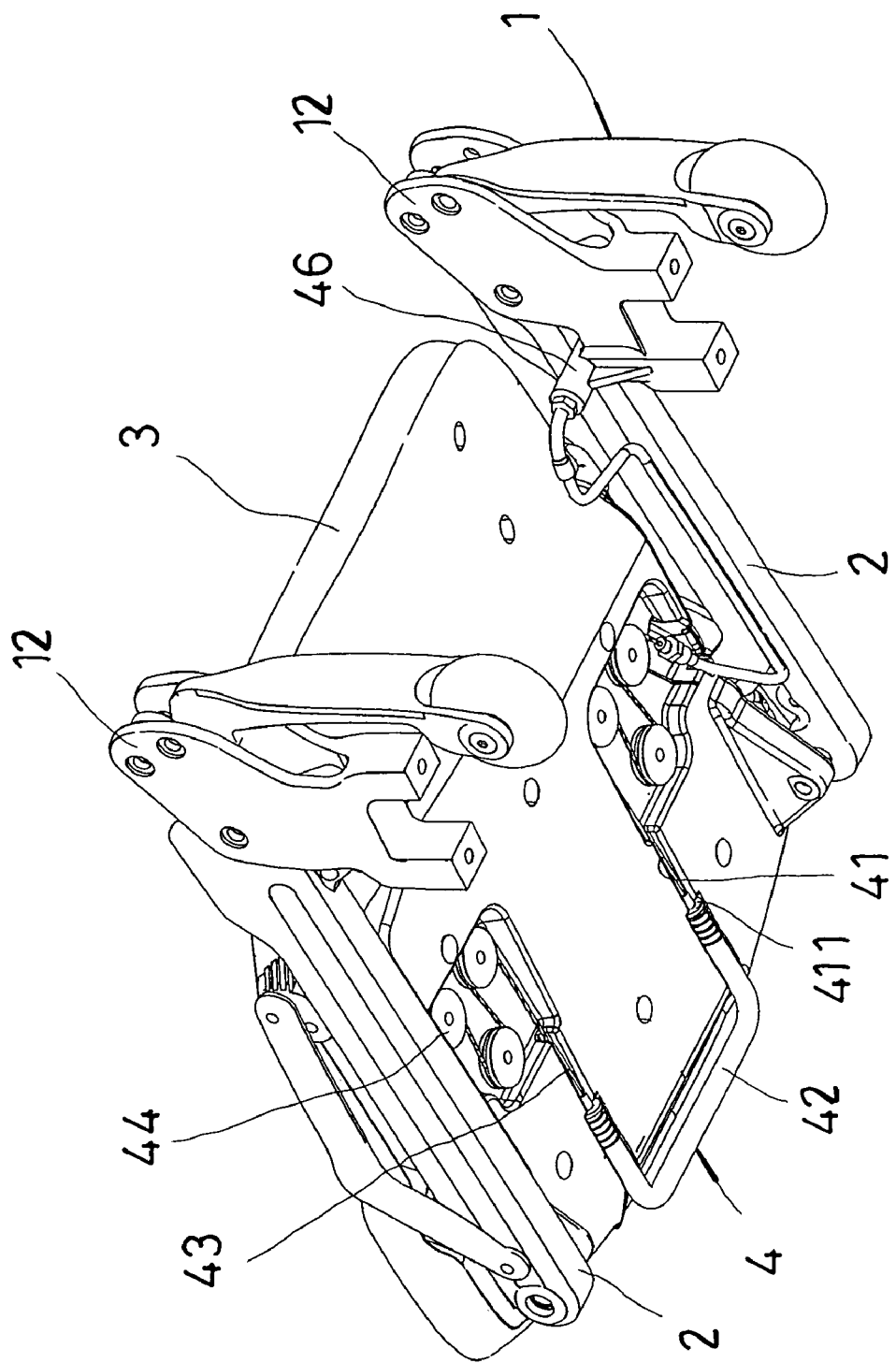
FIG. 5 is a bottom perspective view of the fixing mechanism.
Figure 6:
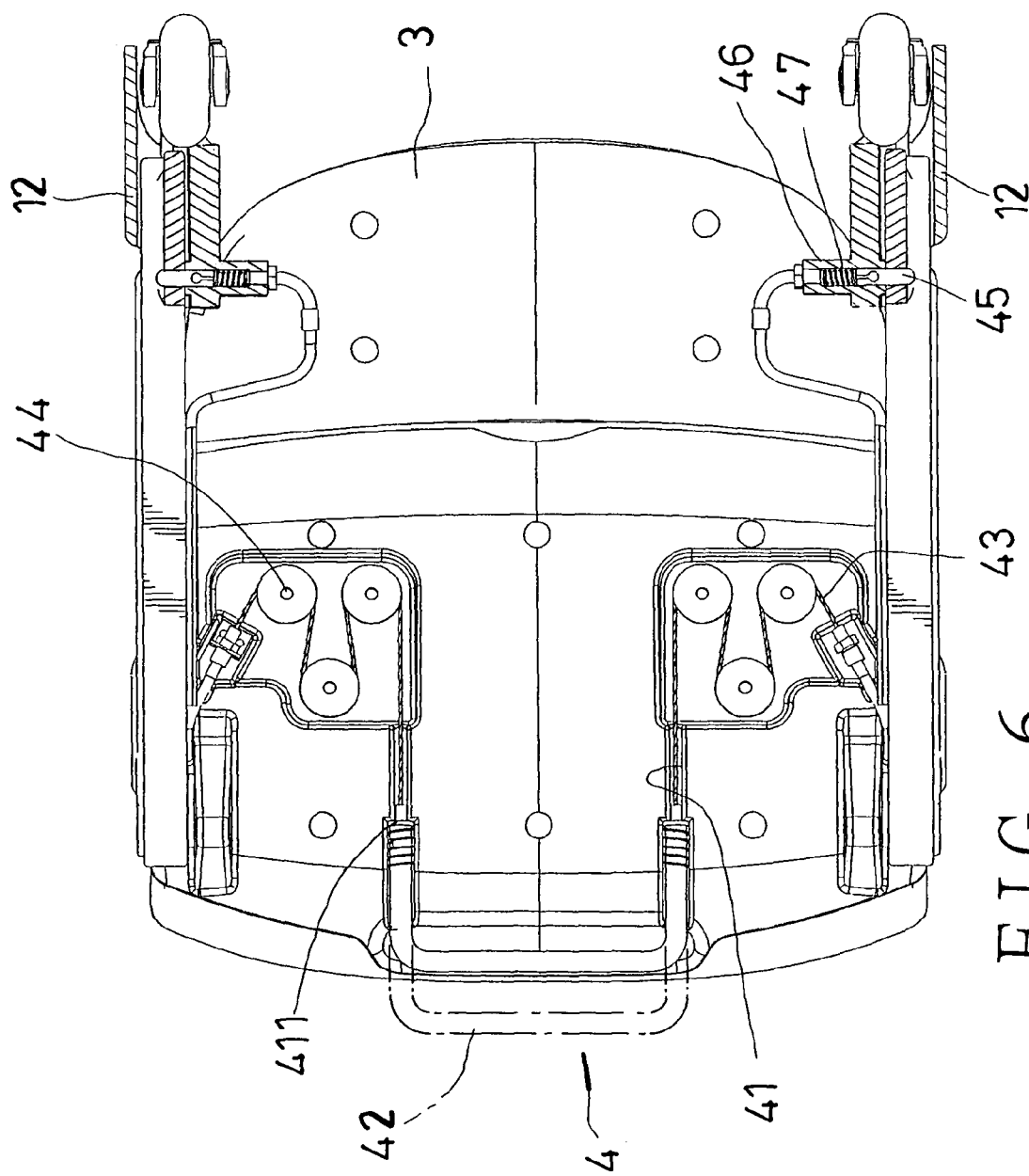
FIG. 6 is a bottom view of the fixing mechanism.

Referring to FIGS. 5 and 6, the seat 3 has a pair of passage grooves 41 on a bottom side thereof to receive a portion of the fixing mechanism 4, and a stopping part 411 is formed in each of the passage grooves 41. The fixing mechanism 4 includes:

a handle 42, and two pulling strings 43; the pulling strings 43 are each joined to one of two ends of the handle 42; the two ends of the handle 42 are passed through the passage grooves 411 respectively so that the handle 42 is stopped from moving further into the passage grooves 41 by means of the stopping parts 411; the pulling strings 43 extend along the passage grooves 41 respectively;

two labor-saving pulley combinations 44 fitted on the bottom side of the seat 3; the pulling strings 43 are passed over the labor-saving pulley combinations 44 respectively;

two holding sleeves 46, which are firmly joined on the vehicle body 1 so as to face the curved slots 21 of the pivotal members 2 respectively;

two fixing components 45, which are each connected to the other end of a respective said pulling string 43, and held in a respective said holding sleeve 46; and two elastic elements (springs) 47, which are each held in one of the holding sleeves 46, and in contact with a corresponding said fixing component 45 so as to bias the fixing component 45 towards a corresponding said pivotal member curved slot 21.

Figure 7:
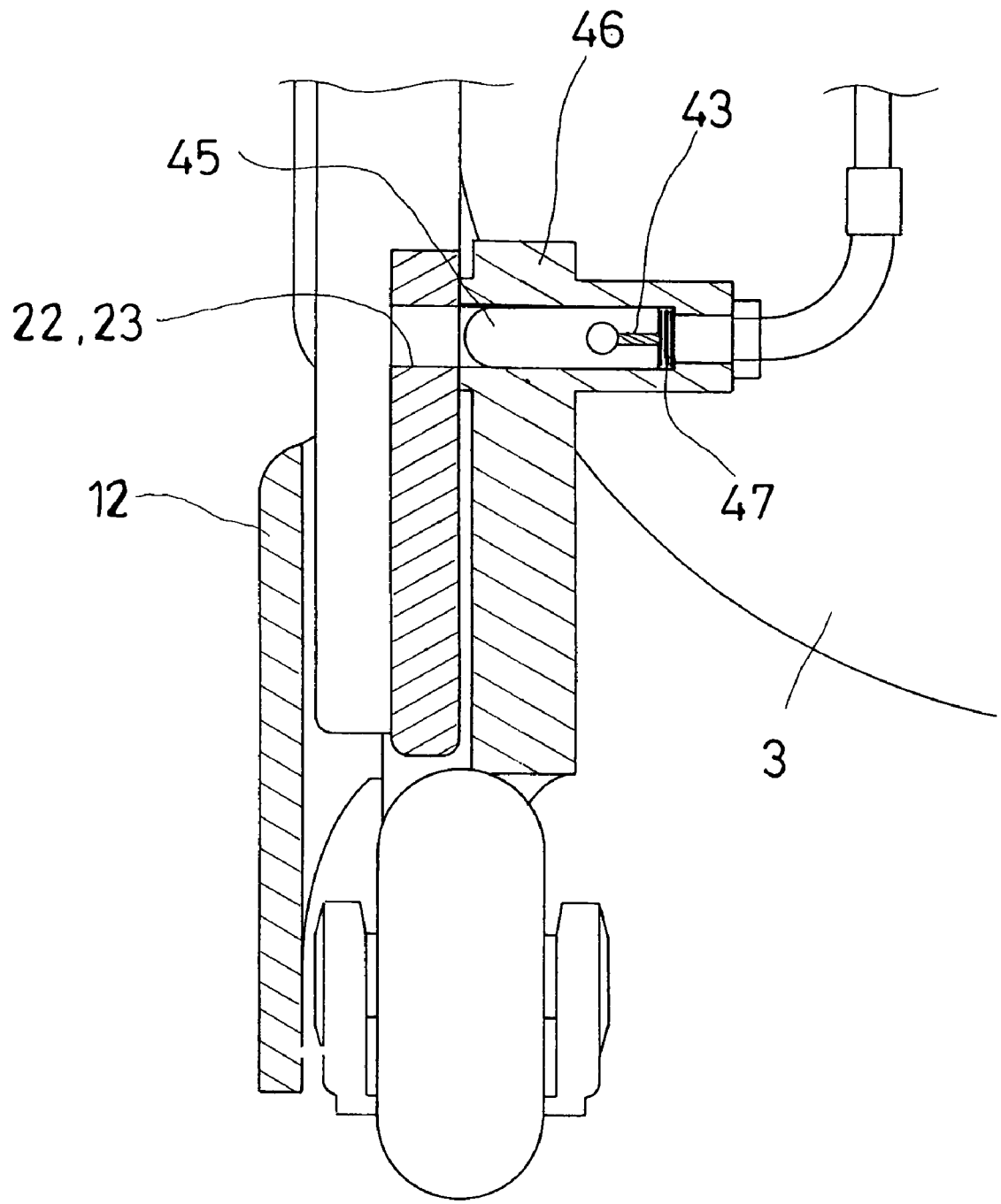
FIG. 7 is a partial sectional view of the present invention, taken when the fixing mechanism is being operated (1)

Therefore, the fixing components 45 will normally be partly held in the curved slots 21 of the pivotal members 2. And, the fixing components 45 will be moved out of the curved slots 21 with the elastic elements 47 being compressed as soon as the handle 42 is pulled, as shown in FIG. 7. The handle 42 can be pulled to move the fixing components 45 out of the curved slots 21 with a relatively small amount of force because the pulling strings 43 are passed over the labor-saving pulley combinations 44. Therefore, the user can operate the handle 42 so as to move the fixing mechanism 4 to a freeing configuration even if the user is suffering from physiological deterioration, e.g. a very old person and a person suffering from a minor paralysis.

The fixing components 45 will be partly held in the second fixing holes 23 of the pivotal members to fix the seat 3 in a raised in-use position; because each said pivotal member 2 has at last two second fixing holes 23, the height of the seat 3 can be adjusted according to the user's need.

Figure 8:
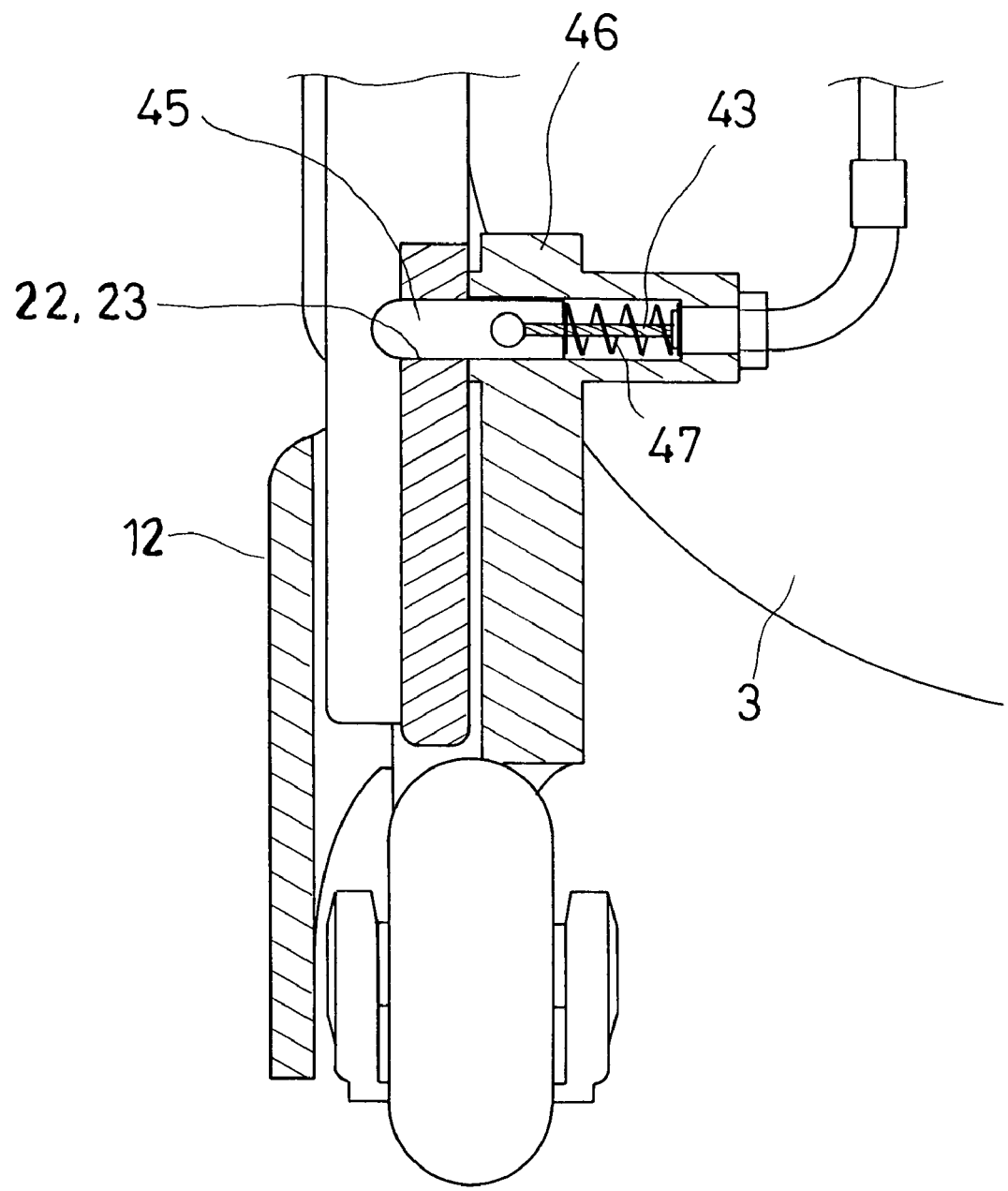
FIG. 8 is a partial sectional view of the present invention, taken when the fixing mechanism is being operated (2).

After the handle 42 is pulled so as to move the fixing components 45 out of the second fixing holes 23 of the pivotal members 2, the seat 3 and the pivotal members 2 can be pivoted downwards so that the seat 3 is received in the hollow holding portion 11 of the vehicle body 1. After the seat 3 is moved to the lowermost position, the first fixing holes 22 of the pivotal members 2 will face the fixing components 45 of the fixing mechanism 4; the fixing components 45 will be forced to move into the first fixing holes 22 by the elastic elements 47 as soon as the user's releases the handle 42, as shown in FIG. 8. Consequently, the vehicle is fixed in the folded configuration, having a relatively flat shape to occupy less space; other persons can easily store and move/transport the present people-carrying vehicle.

From the above description, it can be seen that the people-carrying vehicle of the present invention has the following advantages:

1. The people-carrying vehicle can be easily moved to and fixed in a folded configuration to have a relatively flat shape to occupy less space. Therefore, other people can store and move/transport the people-carrying vehicle easily.

2. The height of the seat can be adjusted according to the user's need or height because each of the pivotal members has at last two second fixing holes to cooperate with the fixing components to fix the seat in a raised position. Therefore, the vehicle can provide more convenience to a user, especially one who has injured lower limbs or is suffering from physiological deterioration, e.g. a very old person and a person suffering from a minor paralysis.

What is claimed is:

1. A folding and fixing structure of a people-carrying vehicle, comprising:

at least one pivotal member interposed between and pivoted at two ends thereof to a vehicle body and a seat of the vehicle; the pivotal member having a first fixing hole thereon; the pivotal member having at least one second fixing hole thereon; and a fixing mechanism to fix the seat; the fixing mechanism including a fixing component; the fixing component being partly held in the first fixing hole of the pivotal member to fix the seat when the seat is in a lowered not-in-use position; the fixing component being partly held in the second fixing hole of the pivotal member to fix the seat when the seat is in a raised in-use position;

wherein the vehicle body has a supporting member at each of two sides thereof, and there are two said pivotal members, which are pivoted to the supporting members respectively;

each said pivotal member having a curved slot; the first fixing hole of each said pivotal member adjoining a lower end of a corresponding said curved slot; the second fixing hole of each said pivotal member adjoining an upper end of a corresponding said curved slot;

the seat having two passage grooves on a bottom side thereof; the seat having a stopping part in each of the passage grooves thereof;

the fixing mechanism further including:

(a) a handle, and two pulling strings each joined to one of two ends of the handle; the two ends of the handle being passed through the passage grooves respectively, with the handle being stopped at the two ends by the stopping parts formed in the passage grooves of the seat; the pulling strings extending along the passage grooves respectively;

(b) two holding sleeves firmly joined on the vehicle body to face the pivotal members respectively;

(c) two fixing components, which are each connected to a respective said pulling string, and held in a respective said holding sleeve; and (d) two elastic elements held in the holding sleeves respectively; the elastic elements being each in contact with a corresponding said fixing component.

2. The folding and fixing structure of a people-carrying vehicle as claimed in claim 1, wherein the vehicle body has a hollow holding portion, and the seat will be received in the hollow holding portion when it is in a lowered not-in-use position.

3. The folding and fixing structure of a people-carrying vehicle as claimed in claim 1, wherein the pivotal member has at least two second fixing holes thereon.

4. The folding and fixing structure of a people-carrying vehicle as claimed in claim 1, wherein the fixing mechanism further includes a labor-saving pulley combination fitted on a bottom side of the seat, and the pulling strings are passed over the labor-saving pulley combination.

5. The folding and fixing structure of a people-carrying vehicle as claimed in claim 1, wherein the elastic elements are springs.

\* \* \* \* \*